Aug. 20, 1935.  E. O'MALLEY  2,011,688
VALVE SEAT RESURFACING TOOL
Filed April 25, 1934
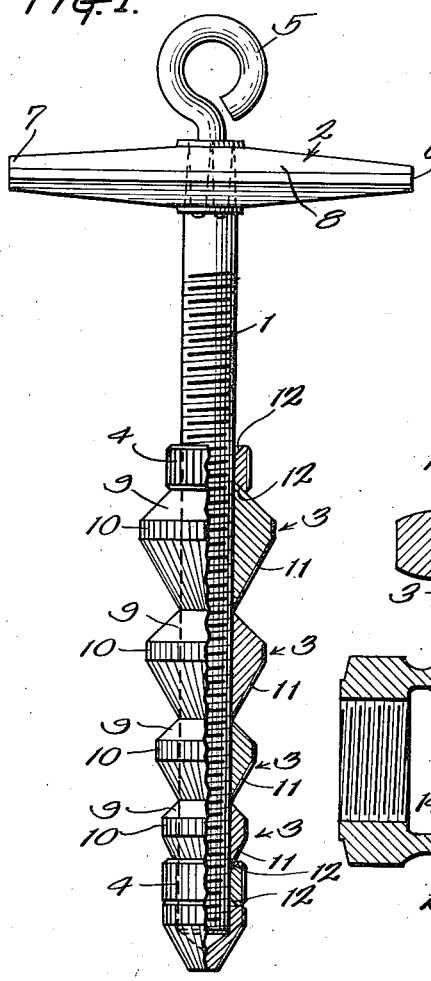
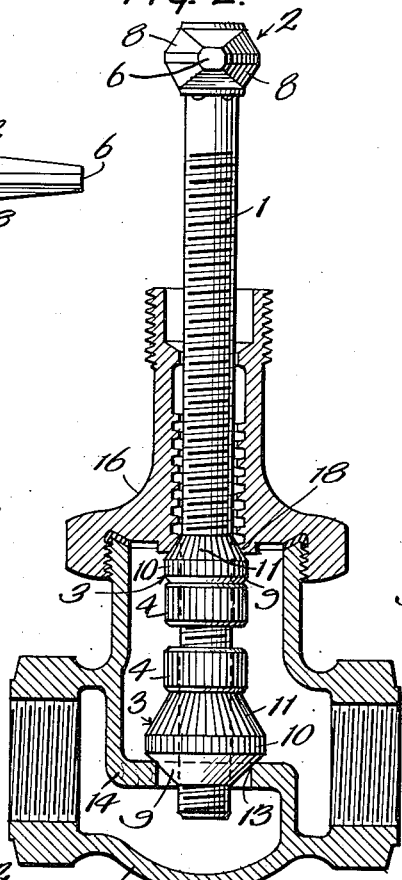
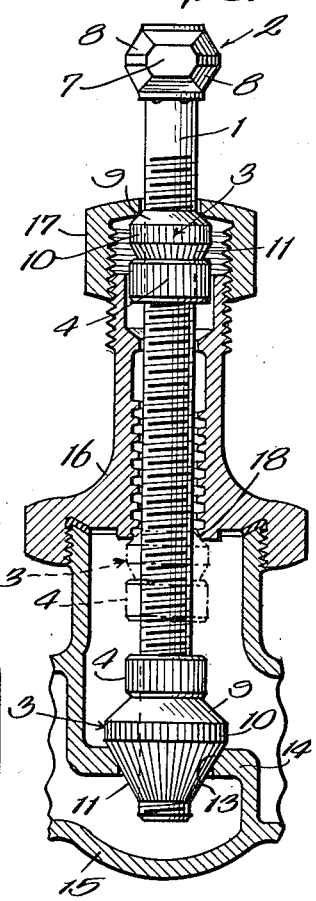
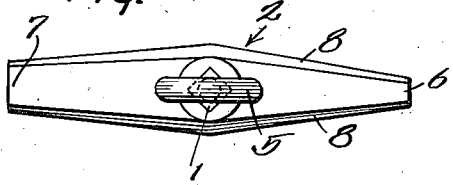
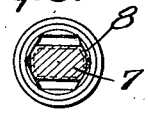
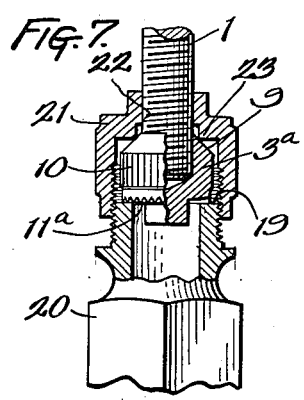
INVENTOR
EDWARD O'MALLEY
BY Langdon Moore
ATTY.

Patented Aug. 20, 1935

2,011,688

UNITED STATES PATENT OFFICE 2,011,688

VALVE SEAT RESURFACING TOOL

Edward O'Malley, Chicago, Ill., assignor of one-third to James G. McNeil and one-third to Edward W. O'Malley, Chicago, Ill.

Application April 25, 1934, Serial No. 722,224

1 Claim. (Cl. 90—12.5)

This invention relates to improvements in valve resurfacing tools and more particularly to a tool of this character including a plurality of unitary reaming and centering elements which adapt the tool to be guided or centered by the bonnet or packing nut of valves of different sizes for resurfacing the seat thereof.

It is an object of this invention to provide a tool of simple inexpensive construction in which the essential elements have dual functions, is adaptable to valves of different sizes and types and provides a means for storing the various elements when not in use.

With these and other objects in view, reference is made to the accompanying sheet of drawings illustrating a preferred embodiment of this invention with the understanding that minor changes may be made therein without departing from the scope thereof.

In the drawing:

Figure 1 is a view partly in front elevation and partly in vertical central section of the assembled tool when not in use.

Figure 2 is a view partly in elevation and partly in section illustrating the application of this improved tool in preparing the bonnet of a globe valve to act as a guiding and centering means.

Figure 3 is a fragmentary view similar to Figure 2 illustrating in full lines an application of this invention in which the packing nut is employed as a guiding and centering means, and in broken lines when the bonnet is employed for this purpose.

Figure 4 is a top plan view of Figure 1.

Figure 5 is a detail view in transverse section of one end of the handle illustrating its application in removing a valve seat.

Figure 6 is a view similar to Figure 5 illustrating the application of the other end of the handle for the same purpose.

Figure 7 is a fragmentary detail view partly in elevation and partly in central vertical section of a form of this invention as applied to a faucet valve.

Figure 1 illustrates the complete tool contemplated by this invention, as assembled when not in use, including a reamer spindle 1 threaded throughout except where the upper end is tapered to be centrally received and engaged by an operating handle 2 and with a plurality of combined reaming and centering elements 3 and jam nuts 4 threaded thereon. It is also preferable to provide the end of the spindle 1 at the end mounting the handle 2 with an eye hook 5 threaded thereinto to retain the handle in place and also act as a hanger for the assembled tool when not in use.

The handle 2 is preferably rectangular in cross section and tapered from the center to ends 6 and 7 of different sizes with the edges 8 along each side beveled adapting the handle to be used as a short bar for insertion within a valve to remove its seat, as shown in Figures 5 and 6.

Each combined reaming and centering element 3 is preferably formed of hardened steel axially drilled and tapped to fit over the threaded spindle 1 and includes a conical smooth centering surface 9 departing from the spindle at an angle, substantially 45°, and terminating in a narrow cylindrical knurled surface 10 with a conical reaming surface 11 departing from the other side thereof to meet the threaded spindle 1 at an angle thereto, preferably at an angle of substantially 30° to the spindle axis. The reaming surface 11 is preferably knurled or milled. To accommodate this tool to valve seats of different sizes a plurality of combined reaming and centering elements 3 are provided in which the diameter of the cylindrical surfaces 3 are graduated whereby the element having reaming surfaces of proper size may be selected to reseat the desired valve. It is desirable to omit the conical centering surfaces upon the smallest reamer and to partially drill the flat surface above the reaming surface, so that the smallest reamer forms a cap for the end of the spindle as shown in Figure 1.

In the operation of the improved tool, the combined reaming and centering elements are employed in pairs secured in their adjusted position by the jam nuts 4. It is preferable to provide the opposite flat surfaces of the jam nuts 4 about the bore with a conical recess 12 to receive and bear against the conical surface of the element 3 when engaged therewith.

In carrying out this invention one of the elements 3 is adjusted upon the spindle 1 with a smooth surfaced cone 9 adapted to be centered and guided by the interior of the bonnet or packing nut of the valve casing and the other with its reaming surface 11 in engagement with the seat to be resurfaced and as the tool is rotated by the handle 2 the contact with the valve seat is maintained by taking up on the bonnet or packing nut.

Figures 2 and 3 illustrate a commercial globe valve in which the seat 13 is provided in the diaphragm 14 of the casing 15, which mounts the usual threaded bonnet 16 and threaded packing nut 17.

When it is desired to mount the tool to be guided by the bonnet and it is found that the recess 18 about the bore of the bonnet is insufficient for proper guidance, the positions of the elements 3 upon the spindle 1 are reversed, that is, the guiding surface 9 of the lower element 3 is arranged to bear upon the valve seat 13 and the reaming surface 11 of the upper element to bear upon the bonnet. The bonnet with the valve stem and packing nut is removed from the casing 15, the tool with the elements reversed as above described, inserted, the valve stem and packing nut removed from the bonnet and the bonnet 16 placed over the spindle 1 and partially threaded upon the casing 15 with the smooth conical surface 9 of the lower element 3 centered upon the valve seat and the reaming surface 11 of the upper element engaging the bonnet recess 18. As the tool is rotated the body of the bonnet 16 about the recess 18 is fed upon the reaming surface 11 of the upper element 3 by threading the bonnet 16 upon the casing 15 until a satisfactory guiding surface has been produced, as shown in Figure 2. The bonnet 16 is then removed from the casing and from the tool. The elements 3 are removed from the spindle 1 and after turning the elements 3 to reverse the relation of their conical surfaces are replaced and secured by the jam nuts 4 upon the spindle 1 and the bonnet 16 again placed over the spindle with the elements 3 within the casing 15 and the bonnet partially threaded thereon to cause the reaming surface 11 of the lower element 3 to contact the valve seat 13 with the smooth conical surface 9 of the upper element 3 received in and guided by the recess 18 about the bore of the bonnet 16, as shown in broken lines in Figure 3, and the spindle 1 rotated by the handle 2 to resurface the valve seat. During this operation the reamer is fed upon the valve seat by further threading of the bonnet 16 upon the casing 15.

If it is desired to center and guide the tool by the packing nut 17, after the valve stem packing therefrom has been removed, the nut 17 is partially threaded upon the bonnet 16, the spindle 1 with the upper element 3 adjusted with its smooth conical centering surface 9 to engage the interior of the packing nut 17 inserted in the bonnet 16 with the spindle passing through the packing nut 17 and the bonnet 16 threaded home on the casing 15, as shown in full lines in Figure 3. In this case during the resurfacing of the valve seat 13 the reamer is fed thereupon by the taking up of the packing nut 17 upon the threads of the bonnet 16.

In plumbing faucets of the compression type, the tool is operated in the same way as above described and is guided and centered by the faucet packing nut. In some types of faucets the valve seat is a flat surface 19 formed upon the casing 20 of the faucet, as shown in Figure 7. To resurface such a seat a modified form of reaming and centering element 3a is provided differing only from the element 3 hereinbefore described in that a flat knurled surface 11a is provided lying in a plane at right angles to the spindle axis. It is also preferable to provide an adapter 21 to be used in connection with the modified element 3a which consists of a casing having a central bore 22 for the reception of the spindle 1 with an internal shoulder 23 for engagement with the smooth conical centering surface 9 of the element 3a with the open end formed to be threaded upon the casing 20 of the faucet. In this form the reamer is fed upon the seat by taking up on the adapter in the same manner as the packing nut 17 or bonnet 16 as described in connection with Figures 2 and 3.

What I claim is:

A tool for resurfacing the seats of valves provided with a bonnet having a threaded aperture to receive a valve stem including, the combination of an operating spindle freely movable within the said aperture and two combined conical reamer-guides mounted thereon, each having a conical reaming surface more tapering than the oppositely disposed conical guiding surface thereon to first form a circular guiding surface upon the interior opening of said threaded aperture by the reaming surface of one reamer-guide with the guiding surface of the other rotating in the valve seat and then centering the spindle therein by reversing the surfaces of the respective reamer-guides to resurface the seat without damage to said bonnet threads.

EDWARD O'MALLEY.